United States Patent [19] [11] 4,169,814
Inaba et al. [45] Oct. 2, 1979

[54] PROCESS FOR PRODUCING CATALYSTS COMPRISING A CARRIER IMPREGNATED WITH A SOLUTION OF CHLOROPLATINIC ACID AND BARIUM HYDROXIDE FOR DECOMPOSING AMMONIA BY OXIDATION

[75] Inventors: Hideya Inaba; Yasumi Kamino; Shigenori Onizuka; Chikashi Inazumi, all of Osaka, Japan

[73] Assignee: Hitachi Shipbuilding & Engineering Co., Ltd., Osaka, Japan

[21] Appl. No.: 875,087

[22] Filed: Feb. 3, 1978

[30] Foreign Application Priority Data
Jan. 13, 1978 [JP] Japan ................................. 53-2901

[51] Int. Cl.$^2$ ....................... B01J 27/10; B01J 23/58; B01J 23/64; C01C 3/00
[52] U.S. Cl. .................................... 252/441; 252/464; 252/466 PT; 252/473; 423/237
[58] Field of Search .......... 252/466 B, 466 J, 466 PT, 252/464, 473, 441, 442; 423/237

[56] References Cited
U.S. PATENT DOCUMENTS

| 3,409,390 | 11/1968 | Hoekstra | 252/473 |
| 3,467,491 | 9/1969 | Hardison | 252/466 B |
| 3,873,472 | 3/1975 | Oshima et al. | 252/466 B |
| 3,944,504 | 3/1976 | Fora et al. | 252/466 B |
| 4,040,981 | 8/1977 | Inaba et al. | 252/463 |

FOREIGN PATENT DOCUMENTS 39-2239 3/1964 Japan ................................. 252/464

Primary Examiner—P. E. Konopka
Attorney, Agent, or Firm—Armstrong, Nikaido, Marmelstein & Kubovcik

[57] ABSTRACT

A catalyst for decomposing ammonia by oxidation is produced by converting the surface layer of steel material of specified shape resembling a ring, honeycomb, plate or the like to an aluminum alloy, treating the steel material with an aluminum dissolving solution to dissolve out the aluminum and to render the surface layer porous, subjecting the steel material to oxidation treatment to obtain a catalyst carrier, immersing the carrier in a solution of chloroplatinic acid adjusted to weak alkalinity with barium hydroxide, and drying the carrier after withdrawing the carrier from the solution.

12 Claims, 2 Drawing Figures

PROCESS FOR PRODUCING CATALYSTS COMPRISING A CARRIER IMPREGNATED WITH A SOLUTION OF CHLOROPLATINIC ACID AND BARIUM HYDROXIDE FOR DECOMPOSING AMMONIA BY OXIDATION

BACKGROUND OF THE INVENTION

This invention relates to catalysts for decomposing ammonia ($NH_3$) to nitrogen gas ($N_2$) and water ($H_2O$) by oxidation for the treatment of ammonia contained in various exhaust gases.

The activity and life of catalysts are significant factors in catalytic reactions. Additionally the pressure loss attributable to the configuration of catalysts poses a serious problem. When large quantities of gases are treated especially as is the case with the treatment of exhaust gases, marked pressure losses, if involved, will lead to an increased power consumption for blowers and other devices, resulting in an increased operating cost. To overcome the problem of such pressure losses, honeycomb-shaped carriers of ceramics have been developed and introduced into use in place of conventional granular carriers. However, ceramics carriers, which are of poor strength and fragile, are not suited to the treatment of large quantities of gases such as exhaust gases. To overcome the problems described above, we have carried out intensive research in an attempt to provide oxidizing catalysts having outstanding strength and usable without enabling pressure losses. Our efforts have matured to the development of catalysts which are produced by rendering the surface layer of steel material of specified shape resembling a ring, honeycomb, plate or the like porous, subjecting the steel material to oxidation treatment to obtain a catalyst carrier, and causing the carrier to support platinum by immersing the carrier in a solution of a platinum compound. In the final step of this process, it is most suitable to use an aqueous solution of chloroplatinic acid.

In the process described above, the aqueous solution of chloroplatinic acid penetrates into the pores of the carrier, thereby permitting the platinum to be supported by the carrier. Thus the adsorption of platinum by the carrier hardly takes place. Consequently, the amount of the solution gradually reduces with the repetition of the immersion treatment, but the platinum concentration of the solution remains unchanged. The treating bath may therefore be replenished, from time to time, with a fresh aqueous solution of chloroplatinic acid of the same concentration. However, since the aqueous solution of chloroplatinic acid is acidic, part of the steel carrier will dissolve out into the treating bath in the course of the treatment, giving rise to the necessity of removing the dissolved iron from the bath if it is desired to continually repeat the treatment with use of the same bath while replenishing the bath with a fresh solution. The dissolving out of iron could be prevented by rendering the bath alkaline, but the adjustment of the pH of the bath must then be made without leading to the formation of any precipitate whatever. It is also critical that the catalyst produced with use of the adjusted solution be still as active as desired.

SUMMARY OF THE INVENTION

Our research has revealed that these requirements can be fulfilled advantageously by the use of a specified pH adjusting agent, and based on this finding we have accomplished this invention.

This invention provides a process for producing catalysts for decomposing $NH_3$ by oxidation comprising the first step of converting the surface layer of steel material of specified shape resembling a ring, honeycomb, plate or the like to an aluminum alloy, the second step of treating the steel material with an aluminum dissolving solution to dissolve out the aluminum and to render the surface layer porous, the third step of subjecting the steel material to oxidation treatment to obtain a catalyst carrier, the fourth step of immersing the carrier in a solution of chloroplatinic acid adjusted to weak alkalinity with barium hydroxide, and the fifth step of drying the carrier after withdrawing the carrier from the solution.

Although the catalyst carrier prepared from a steel material by the first to third steps of the above process has some activity to oxidize and decompose $NH_3$ in itself, this activity is not as high as is practically useful, whereas the catalysts prepared from the carrier by causing the carrier to support Pt and Ba thereon according to the process of this invention have high activity. Moreover the pH adjusting agent, i.e. barium hydroxide, does not produce any precipitate whatever in the chloroplatinic acid solution, nor does it exert any adverse effect on the activity of the catalyst obtained.

PREFERRED EMBODIMENTS OF THE INVENTION

Figure 1:
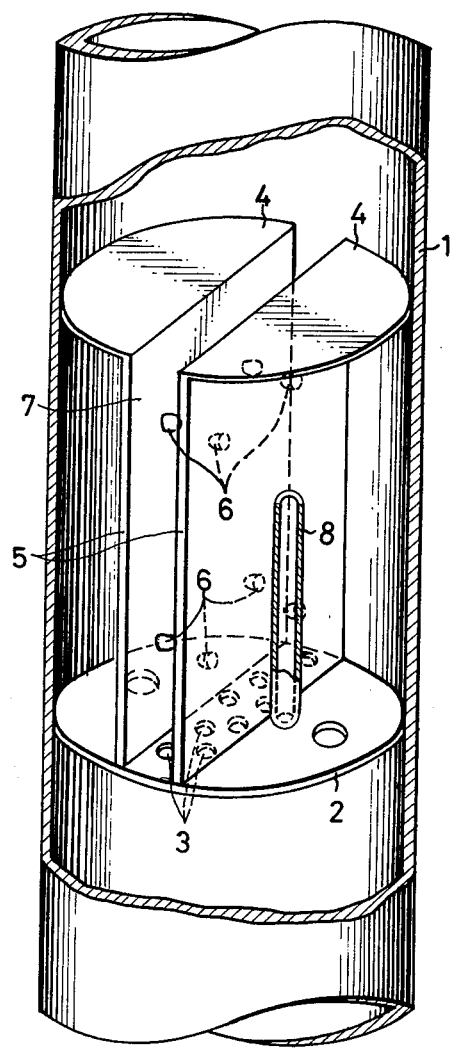
FIG. 1 is a perspective view partly broken away and showing an activity testing reactor.

According to this invention steel materials in the shape of a ring, honeycomb, plate or the like as specified are used because steel materials of such shape have high strength and are therefore unlikely to cause substantial pressure losses when used for the treatment of large quantities of exhaust gases. Examples of useful steel materials are stainless steel, carbon steel, nickel steel tungsten steel, molybdenum steel, etc. These examples are not limitative; pure iron is of course usable.

In the first step, the surface layer of the steel material is converted to an aluminum alloy usually by coating the steel material with aluminum and heat-treating the aluminum-coated steel material. The steel material can be so coated, for example, by hot dipping, cementation, vacuum evaporation, spray coating or like plating method. The heat treatment is conducted at a temperature of not lower than the melting point (660° C.) of aluminum, preferably at about 800° C., for several minutes to several hours, preferably for about one hour. The heat treatment causes the solid phases of the steel material and aluminum to diffuse through each other, forming an alloy.

In the second step, the aluminum is dissolved out from the steel material having the alloy layer by immersing the steel material in a solution capable of dissolving aluminum or by spraying the aluminum dissolving solution against the alloy layer of the steel material. Examples of useful aluminum dissolving solutions are aqueous acid or alkali solutions. Examples of preferred acids are mineral acids such as hydrochloric acid and nitric acid. Examples of useful alkalis are sodium hydroxide and like alkali metal hydroxides, alkali metal carbonates, alkaline earth metal hydroxides, etc. Aqueous solutions of alkali metal hydroxides are especially preferable. The temperature of the aluminum dissolving solutions, although not particularly limited, is preferably room temperature to 100° C. The dissolving out of the aluminum from the steel material renders its surface layer porous. The steel material having the resulting porous surface layer is washed with water and dried in the usual manner.

In the third step, the steel material is subjected to oxidation treatment under mild conditions, for example, by contacting the porous surface layer with a gas containing 0.1 to 20.8% by volume of oxygen for instance at approximate room temperature to 400° C. for 0.1 to 20 hours. Water, $CO_2$ or $N_2$, if present in the oxidizing atmosphere, will produce little or no influence on the effects achieved by the treatment. In this way, a carrier is produced according to this invention.

It is desirable that after the third step, the carrier be made to support vanadium (V) thereon by immersing the carrier in an aqueous solution or oxalic acid solution of ammonium metavanadate ($NH_4VO_3$) or like vanadium compound, withdrawing the carrier and drying and/or firing the wet carrier. The concentration of the V compound is preferably 0.01 to 0.1 mole/liter. The preferred immersion time is several tens of minutes to 2 hours. The wet carrier is fired preferably at a temperature of 600° to 700° C. for 1 to 2 hours. When the carrier is thus fired, the vanadium supported thereon can be prevented from dissolving out into the solution of platinum compound used in the fourth step. The vanadium incorporated into the carrier inhibits the formation of nitrogen monoxide attendent on the oxidation decomposition of $NH_3$.

Barium hydroxide, which has low solubility in water, is used usually in the form of a saturated aqueous solution in the fourth step. The solution of chloroplatinic acid adjusted to weak alkalinity is prepared, for example, by preparing a solution of chloroplatinic acid of 10 to 15 times the concentration of the solution to be finally formulated, adding a saturated aqueous solution of barium hydroxide to the acid solution to render the acid solution weakly alkaline and adding a required amount of water to the alkaline solution. The pH values preferred to ensure weak alkalinity are in the range of about 9 to about 10. Preferably the chloroplatinic acid solution has a concentration of 0.01 to 1.0% by weight, calculated as Pt. The preferred immersion time is 10 minutes to one hour. Ammonia water, if used as a pH adjusting agent in place of barium hydroxide, will produce a suspension even at a pH of 3 to 4, forming a yellow precipitate, hence unusable.

The wet product is then dried in the fifth step at about 100° C. or slightly higher temperatures. The catalyst thus produced contains 0.0001 to 0.1% by weight of Pt.

Examples of this invention will be given below. The catalysts prepared were tested for activity in comparison with other catalysts.

EXAMPLE 1

Panels of stainless steel, SUS 304 (JIS), measuring 20 mm×25 mm×5 mm, were immersed in a molten aluminum bath at 700° C. for 5 minutes, then withdrawn from the bath and thereafter heat-treated in an electric oven at 800° C. for one hour. The panels were cooled, then immersed in 10% NaOH aqueous solution at 80° C. for 3 hours, thereafter withdrawn from the solution and subsequently washed with water treated with ion exchange resin. The washed panels were subjected to three-stage oxidation treatment under the conditions listed in Table 1, whereby a catalyst carrier was prepared.

Table 1

| | Atmosphere | Temp.(°C.) | Time (chr.) |
|---|---|---|---|
| 1st Stage | $O_2$ (2 vol. %) + $N_2$ (balance) | 100 | 1 |
| 2nd Stage | $O_2$ (10 vol. %) + $N_2$ (balance) | 200 | 1 |
| 3rd Stage | Air | 300 | 1 |

Separately a solution of chloroplatinic acid for immersion treatment was prepared which contained 0.1% by weight of Pt and had its pH adjusted to 9.5 with a saturated aqueous solution of barium hydroxide. The solution was found to be free of any precipitation.

The catalyst carrier prepared as above was immersed in the solution at room temperature for one hour, then withdrawn from the solution and dried at 110° C. for one hour, giving a catalyst (A) containing Pt and Ba.

EXAMPLE 2

A solution of chloroplatinic acid for immersion treatment was prepared which contained 0.3% by weight of Pt and had its pH adjusted to 9.5 with a saturated aqueous solution of barium hydroxide. The same catalyst carrier as prepared in the course of the procedure of Example 1 was immersed in the solution in the same manner as in Example 1, giving a catalyst (B) containing Pt and Ba.

EXAMPLE 3

The same carrier as obtained in the course of the procedure of Example 1 was immersed in 200 ml of aqueous solution of $NH_4VO_3$ (0.1 mole/liter) for 10 minutes, then withdrawn from the solution, thereafter dried at 110° C. for one hour and further fired in air at 650° C. for 90 minutes, whereby the carrier was caused to support V thereon.

The V-supporting carrier was immersed at room temperature for one hour in the same Pt- and Ba-containing solution as used in Example 1. The carrier withdrawn from the solution was dried at 110° C. for one hour, whereby a catalyst (C) was obtained which contained V, Pt and Ba.

Comparison Example 1

A Pt-incorporating catalyst (D) was prepared by repeating the same procedure as in Example 1 except that in place of the Pt- and Ba-containing solution, a solution was used which contained 0.1% by weight of Pt and had its pH adjusted to 9.5 with an aqueous solution of sodium hydroxide (10 moles/liter).

Comparison Example 2

A Pt-incorporating catalyst (E) was prepared by repeating the same procedure as in Example 1 except that in place of the Pt- and Ba-containing solution, a solution was used which contained 0.3% by weight of Pt and had its pH adjusted to 9.5 with an aqueous solution of sodium hydroxide (10 moles/liter).

Comparison Example 3

The same V-supporting carrier as prepared in the course of the procedure of Example 3 was immersed in the same Pt-containing solution as used in Comparison Example 2 and then dried in the same manner as in Comparison Example 2, giving a V- and Pt-incorporating catalyst (F).

Table 2 shows the quantities of metals incorporated in the catalysts prepared in the foregoing Examples and Comparison Examples.

Table 2

| Catalyst | | Metal content (per catalyst panel, in mg) | | |
|---|---|---|---|---|
| | | Pt | V | Ba |
| Example | A | 3.1 | | 0.2 |
| | B | 3.4 | | 0.3 |
| | C | 3.0 | 7.0 | 0.2 |
| Comp. Ex. | D | 0.2 | | |
| | E | 0.6 | | |
| | F | 0.4 | 7.0 | |

Table 2 reveals that the catalysts (A), (B), and (C) of Examples have higher Pt contents than the catalysts (D), (E), and (F) of Comparison Examples.

Activity Test

The catalysts prepared in the foregoing Examples and Comparison Examples were tested for $NH_3$ oxidation decomposition efficiency, percent NO formation, denitration efficiency and percent $SO_2$ oxidation to compare the catalysts in respect of activity.

The catalysts were tested with use of a quartz reactor of the flow type having the following construction. With reference to FIG. 1 the reactor comprises a quartz reactor tube 1 to 30 mm in inside diameter, a lower horizontal quartz plate 2 having a number of air holes 3, upper horizontal quartz plates 4, and a pair of vertical quartz plates 5 facing each other and extending between the opposed under and lower quartz plates 2, 4. The vertical plates 5 are provided with a number of projections 6 for supporting panels of catalyst. The space 7 between the pair of vertical quartz plates 5 is open at its upper end through which catalyst panels are placed into the space 7. Indicated at 8 is a protective tube for a thermometer.

The catalyst (A) of Example 1 was packed into the space 7 of the reactor first, and the reactor was adjusted for reaction to a temperature of 380° C. by an annular electric oven surrounding the reactor. Two kinds of simulated exhaust gases of the compositions shown in Table 3 were passed through the reactor respectively separately.

Table 3

| Composition | Simulated exhaust gas No. | |
|---|---|---|
| | 1 | 2 |
| $NH_3$ | 120 (vol. ppm) | 120 (vol. ppm) |
| NO | 0 (vol. ppm) | 120 (vol. ppm) |
| $SO_2$ | 300 (vol. ppm) | 300 (vol. ppm) |
| $O_2$ | 5 (vol. %) | 5 (vol. %) |
| $CO_2$ | 12 (vol. %) | 12 (vol. %) |
| $H_2O$ | 10 (vol. %) | 10 (vol. %) |
| $N_2$ | Balance | Balance |

Based on a dry state, the gas was passed at a rate of 1.2 liters/min. (S.T.P.). The catalyst had an apparent surface area of 28 cm². Accordingly the flow rate of the gas was 25.7 m/hr. per unit surface area of the catalyst.

$NH_3$ oxidation decomposition efficiency or $NH_3$ removal efficiency, percent NO formation, denitration efficiency and percent $SO_2$ oxidation were calculated from the following equations based on the concentrations of $NH_3$, $SO_2$ and NO as measured at the inlet and outlet of the reactor tube.

$NH_3$ oxidation decomposition efficiency (i.e. $NH_3$ removal $$\text{efficiency}) = \frac{[NH_3 \text{ at inlet}] - [NH_3 \text{ at outlet}]}{[NH_3 \text{ at inlet}]} \times 100$$

$$\text{Percent NO formation} = \frac{[NO \text{ at outlet}] - [NO \text{ at inlet}]}{[NO \text{ at inlet}] - [NO \text{ at outlet}]} \times 100$$

$$\text{Denitration efficiency} = \frac{[NO \text{ at inlet}] - [NO \text{ at outlet}]}{[NO \text{ at inlet}]} \times 100$$

$$\text{Percent } SO_2 \text{ oxidation} = \frac{[SO_2 \text{ at inlet}] - [SO_2 \text{ at outlet}]}{[SO_2 \text{ at inlet}]} \times 100$$

The concentrations of $NH_3$, $SO_2$ and NO were determined by the following methods.

$NH_3$: By passing the gas at the inlet or outlet of the reactor tube through a solution containing dilute sulfuric acid for absorbing $NH_3$, rendering the resulting solution alkaline with NaOH and determinin the concentration of $NH_3$ absorbed with use of an ammonia ion electrode.

$SO_2$: By iodometric titration.

NO: With use of a continuous nitrogen oxide analyzer of the chemiluminescence type.

The same procedure as above was repeated for the catalysts (B), (C), (D), (E) and (F). The results achieved are given in Table 4 and FIG. 2.

Table 4

| Catalyst | Exhaust Gas No. | $NH_3$ oxidation decomposition efficiency (%) | Percent NO formation | Denitration efficiency (%) |
|---|---|---|---|---|
| (Example) | | | | |
| A | 1 | 95 | 23 | |
| " | 2 | 93 | | 11 |
| B | 1 | 98 | 11 | |
| " | 2 | 94 | | 19 |
| C | 1 | 98 | 8 | |
| " | 2 | 98 | | 25 |
| (Comp.Ex.) | | | | |
| E | 1 | 89 | 32 | |
| " | 2 | 89 | | −13* |
| F | 1 | 83 | 15 | |
| " | 2 | 83 | | 2 |

*This indicates an increased NO concentration at the outlet and means 13% in percent NO formation.

Table 4 reveals that the catalysts (A), (B) and (C) of Examples containing Ba in addition to Pt have higher $NH_3$ decomposing activity than the Ba-free catalysts (E) and (F) of Comparison Examples. Especially, the catalyst (C) containing V in addition to Pt and Ba not only has still higher activity but also acts to inhibit the formation of nitrogen monoxide attendent on the oxidation of $NH_3$.

Similarly the catalyst (A) of Example 1 and catalyst (D) of Comparison Example 1 were tested for $NH_3$ oxidation decomposition efficiency by passing the simulated exhaust gas 1 through the reactor at varying reaction temperatures.

Figure 2:
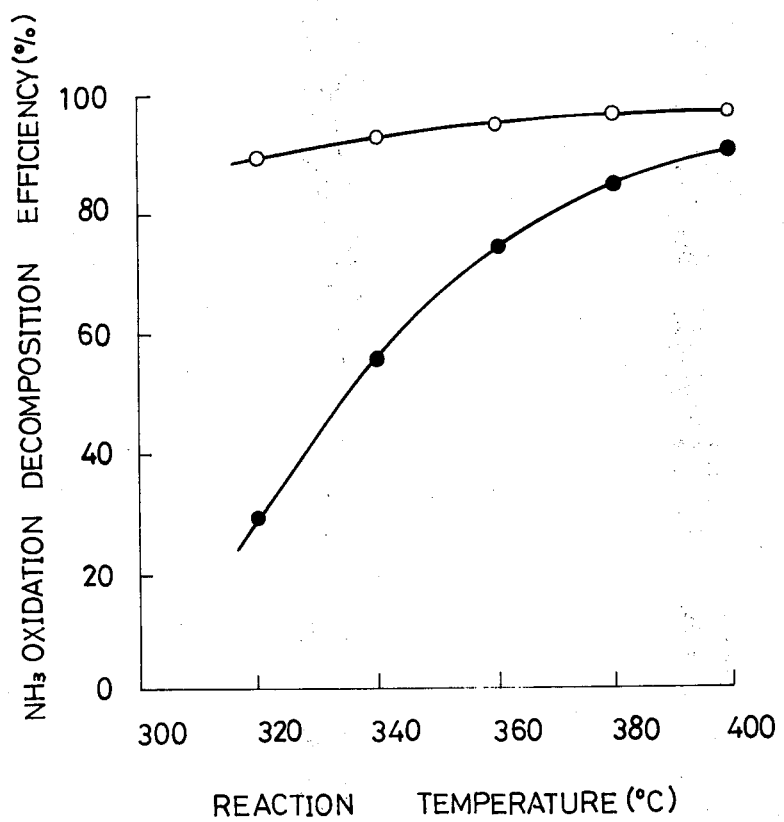
FIG. 2 is a graph showing the relationship between the reaction temperature and the $NH_3$ oxidation decomposition efficiency.

FIG. 2 showing the results indicates that the catalyst (A) has higher activity than the catalyst (D) in the temperature range of from 300° to 400° C.

What we claim is:

1. A process for producing a catalyst for decomposing $NH_3$ by oxidation comprising the steps of converting the surface layer of steel material of specified shape resembling a ring, honeycomb or plate to an aluminum alloy, treating the steel material with an aluminum dissolving solution to dissolve out the aluminum and to render the surface layer porous, subjecting the resulting steel material to oxidation treatment to obtain a catalyst carrier, immersing the carrier in a solution of chloroplatinic acid adjusted to weak alkalinity with barium hydroxide, and drying the carrier after withdrawing the carrier from the solution.

2. A process as defined in claim 1 wherein the surface layer of the steel material is converted to an aluminum alloy by heat-treating an aluminum-coated steel material.

3. A process as defined in claim 1 wherein the aluminum is dissolved out by immersing the steel material having the alloy layer in the aluminum dissolving solution.

4. A process as defined in claim 1 wherein the aluminum dissolving solution is an aqueous solution of an alkali metal hydroxide.

5. A process as defined in claim 1 wherein the oxidation treatment is conducted under mild conditions.

6. A process as defined in claim 5 wherein the oxidation treatment is conducted by contacting the porous surface layer of the steel material with a gas containing 0.1 to 20.8% by volume of oxygen.

7. A process as defined in claim 1 wherein the carrier is immersed in an aqueous solution of chloroplatinic acid having a concentration of 0.01 to 1.0% by weight calculated as platinum.

8. A process as defined in claim 1 wherein the barium hydroxide is used in the form of an aqueous solution.

9. A process as defined in claim 1 wherein the carrier is immersed in an aqueous solution of chloroplatinic acid having its pH adjusted to 9 to 10.

10. A process as defined in claim 1 wherein the carrier is caused to support vanadium before being immersed in the solution of chloroplatinic acid.

11. An oxidizing catalyst produced by the process as defined in claim 1.

12. An oxidizing catalyst produced by the process as defined in claim 10.

* * * * *